United States Patent [19]

Byers et al.

[11] Patent Number: 4,621,679

[45] Date of Patent: Nov. 11, 1986

[54] WATER SYSTEM VALVE FOR DRAINING HEAT EXCHANGERS

[76] Inventors: Hugo A. Byers, 622 S. Lake St., Amherst, Ohio 44001; Fred D. Solomon, 3255 Stony Hill Rd., Medina, Ohio 44256

[21] Appl. No.: 404,553

[22] Filed: Aug. 2, 1982

[51] Int. Cl.[4] .......................... B60H 1/00; F24J 2/40; F27F 27/00
[52] U.S. Cl. ...................................... 165/39; 165/71; 126/420; 126/422; 137/151; 137/625.21; 137/625.46; 251/250
[58] Field of Search ................ 137/625.21, 625.46, 137/79, 142, 151; 251/11, 138, 250; 60/527; 126/420, 422; 165/71, 39

[56] References Cited

U.S. PATENT DOCUMENTS

| | | | |
|---|---|---|---|
| 3,338,140 | 8/1967 | Sheesley | 251/250 |
| 3,430,916 | 3/1969 | Raymond, Jr. | 251/71 |
| 3,986,489 | 10/1976 | Schlesinger | 126/270 |
| 4,044,754 | 8/1977 | Cronin et al. | 126/271 |
| 4,061,132 | 12/1977 | Ashton et al. | 126/271 |
| 4,109,639 | 8/1978 | Keegan | 126/271 |
| 4,119,087 | 10/1978 | Cook | 126/271 |
| 4,138,996 | 2/1979 | Cartland | 126/420 |
| 4,191,166 | 3/1980 | Saarem et al. | 126/430 |
| 4,269,167 | 5/1981 | Embree | 126/420 |
| 4,269,229 | 5/1981 | Saarem et al. | 137/869 |
| 4,280,478 | 7/1981 | Duval et al. | 126/420 |
| 4,326,499 | 4/1982 | Koskela | 126/420 |
| 4,391,268 | 7/1983 | Mathes et al. | 126/420 |

FOREIGN PATENT DOCUMENTS 57-19548  1/1982  Japan .................................. 126/420

Primary Examiner—William R. Cline
Assistant Examiner—John K. Ford
Attorney, Agent, or Firm—Renner, Kenner, Greive, Bobak & Taylor

[57] ABSTRACT

A valve (10) for a water temperature control system having a heat exchanger (C), a tank (T), and a pump (P) for circulating heat transfer fluid through a supply line (11, 12, 13) from the tank to the heat exchanger and through a return line (14, 15) from the heat exchanger to the tank including a valve housing (20) interposed in both the supply line and the return line having supply inlet and supply outlet connections (24, 25), having return inlet and return outlet connections (26, 28), and having first and second drain connections (29), a valve element (45) associated with the valve housing having a first position for normally circulating the heat transfer fluid from the supply inlet connection to the supply outlet connection and from the return inlet connection to the return outlet connection and having a second position discontinuing circulation through the supply inlet connection and the return outlet connection and connecting the supply outlet connection to the first drain connection and the return outlet connection to the second drain connection. Actuation is provided for moving the valve element to the second position upon the occurrence of a reduction in the ambient temperature proximate the heat exchanger below a predetermined value, a loss of power to the valve, or a malfunction of the valve.

16 Claims, 4 Drawing Figures

WATER SYSTEM VALVE FOR DRAINING HEAT EXCHANGERS

TECHNICAL FIELD

The present invention relates generally to a device for controlling the delivery of fluid to and from a heat exchanger. More specifically, the present invention pertains to a fluid control valve that is selectively switchable from a position providing circulation of fluid from a tank through a heat exchanger to a position that prevents circulation of fluid through the heat exchanger and drains the heat exchanger through the associated valve.

BACKGROUND ART

The use of heat exchangers in the form of air conditioning cooling towers, roof top boilers and solar collectors in temperature control systems employing heat transfer fluid is well known. As a common example the solar collector consists of one or more collector panels forming an array and having a glazing or window positioned for maximum exposure to the sun. Within the collector panels are solar energy absorbers designed to maximize the absorbtion and retention of solar energy. Although there are many different possible configurations and materials employed in solar collectors, most collectors share the common characteristic of having channels in the absorbers through which the heat transfer fluid is circulated to be heated and returned to be utilized or stored in one or more tanks.

In practice, the solar collectors are most commonly mounted in elevated positions, such as the roof of a house, in order to have unobstructed positional access to the sun, to utilize pre-existing structural support and to facilitate transmission of the heat transfer fluid. While most solar collectors utilize water as the heat transfer fluid, in climates where the ambient temperatures drop low enough to freeze the fluid within the solar collectors, steps must be taken to prevent the fluid from freezing in the collector. The expansion of a fluid such as water within the collectors upon freezing results in the rupture and destruction of the expensive collectors and necessitates costly replacement. Although anti-freeze additives or special heat transfer fluids are utilized in some systems to prevent the fluid from freezing, such additives or special fluids are expensive, only reduce the freezing point of the fluid to a lower temperature, may be poisonous and therefore not usable in applications such as solar water heaters, and in many instances require more costly associated system components such as special piping, valving, pumps, and double-walled heat exchangers.

Another approach to protecting solar collectors from freezing is to temporarily drain the collectors before the temperature drops below freezing. This requires a system adapted to normally circulate fluid through the collectors and selectively drain the fluid when the ambient temperature proximate the collectors is below a predetermined minimum safe temperature for the fluid. One approach includes the use of a valve positioned below the collector in conjunction with a vacuum breaker positioned at the top of the collector array. Such a valve normally allows collecting fluid to be circulated through the valve, to the collector and back through the valve to storage or use. Translation of the valve to a drain position interrupts all flow connections and establishes communication between the collector return line and a drain line. In order for the valve to effect evacuation of fluid from the collector array when the valve is in the drain position, the vacuum breaker must actuate to allow communication between the highest point of the sealed collectors and the atmosphere. If the vacuum breaker fails to actuate, the collectors will not drain even though the valve is in the drain position. Since the vacuum breaker is characteristically exposed to ambient temperature at the collector array there is a tendency for the vacuum breaker to freeze thus not allowing the collector to drain and resulting in freezing the fluid in the collector and the attendant damage or destruction of the collector.

In order to assure that the valve will drain the collectors, multiple vacuum breakers may in some instances be installed in the collector line, at least one of which breakers being installed other than proximate the collectors where it will not be exposed to freezing temperatures, as for example in an equipment or control room maintained well above freezing temperatures. The addition of the second vacuum breaker doubles the expense and inconvenience without absolutely insuring complete drain down. Thus, Applicant is not aware of the existence of a totally satisfactory system for employing water as the heat transfer medium in colder climates which easily and positively drains collectors during weather conditions which could cause collector damage.

DISCLOSURE OF THE INVENTION

It is therefore an object of the present invention to provide a valve for a water temperature control system having a valve that can be selectively actuated from a position that allows fluid to circulate to and from a heat exchanger such as a solar collector to a position that provides positive drainage from the solar collector through the valve. It is another object of the present invention to provide such a valve that is biased toward the drain position and will therefore assume the drain position in the absence of an actuating force as by a power failure to the system, a failure of the valve actuator or a signal indicating a potentially dangerous freezing temperature condition at the collector. It is a further object of the present invention to provide such a valve that can be remotely actuated by the selective application of electric power.

It is a further object of the present invention to provide a valve that will drain a solar collector array without relying upon timely operation or even existence of vacuum breakers or other components subject to malfunction in a freezing environment. It is another object of the present invention to provide a valve that will be reliable in operation and have a long operational life in the varying environmental conditions extant for such heat exchanger systems. These and other objects of the present invention which will become apparent from the description of the preferred embodiments, are accomplished by means hereinafter described and claimed.

In general, a valve according to the concepts of the present invention for a water temperature control system having a heat exchanger, a tank, and a pump for circulating heat transfer fluid through a supply line from the tank to the heat exchanger and through a return line from the collector to the tank includes a valve housing interposed in both the supply line and the return line having supply inlet and supply outlet connections, having return inlet and return outlet connections, and having first and second drain connections, a valve element associated with the valve housing having a first position for normally circulating the heat transfer fluid from the supply inlet connection to the supply outlet connection and from the return inlet connection to the return outlet connection and having a second position discontinuing circulation through the supply inlet connection and the return outlet connection and connecting the supply outlet connection to the first drain connection and the return outlet connection to the second drain connection, and means for moving the valve element to the second position upon the occurrence of a reduction in the ambient temperature proximate the heat exchanger below a predetermined value, a loss of power to the valve, or malfunction of the valve.

PREFERRED EMBODIMENT FOR CARRYING OUT THE INVENTION

An exemplary valve embodying the concepts of the present invention is designated generally by the numeral 10 in the accompanying drawings. The valve 10 is shown for exemplary purposes as adapted for use in a solar collector system, where various pipes connect solar collector arrays to various heat storage devices and/or heat exchangers in order to supply the solar collectors with a heat exchange fluid which is therein heated and therefrom conducted to the storage devices and/or heat exchangers.

Figure 1:
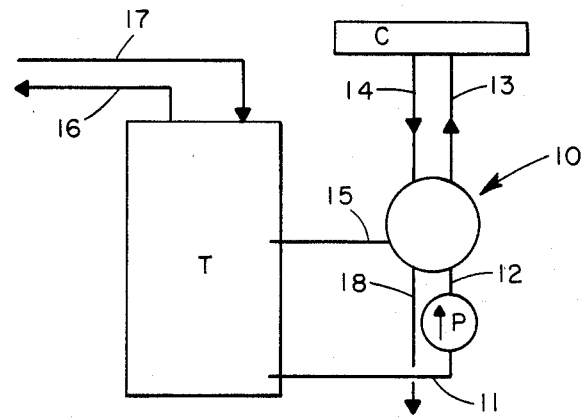
FIG. 1 is a schematic depiction of an exemplary solar energy system employing a valve assembly according to the concepts of the present invention shown in operative relationship to a collector array, a storage tank, and a circulating pump.

As seen schematically in FIG. 1, a typical system contemplates that valve 10 be connected to a fluid storage tank T and to a solar collector C which may be constituted of one or more arrays by various pipes for effecting necessary transport of fluid. In the operative circulation mode a pipe 11 transports fluid normally from the bottom of the storage tank T to a pump P which increases the pressure of the fluid and delivers the fluid to the valve 10 via a supply inlet pipe 12. The valve 10 provides communication between the supply inlet pipe 12 and a supply outlet pipe 13, through which the pressurized fluid flows to the solar collector C where it is heated in conventional fashion by solar energy. The solar collector C is normally positionally elevated with respect to the valve 10 and is mounted in an outdoor environment as opposed to the valve 10, tank T, and pump P which are normally mounted indoors in an environment which is to some extent temperature controlled. The heated fluid is returned from the solar collector by way of a return inlet pipe 14 through valve 10 which directs the fluid into a return outlet pipe 15, to be conducted to the storage tank T. The heated fluid can thus be utilized upon demand by withdrawing the fluid through a heated fluid supply pipe 16, with an unheated fluid supply pipe 17 replenishing the storage tank T with fluid at a lower temperature to be heated in a manner well known to persons skilled in the art.

In the circulation mode the solar collector C is continuously supplied with a flow of fluid which is thereby heated and returned to be stored and/or utilized. In climates where the ambient temperatures drop low enough to freeze the fluid in the collectors, it is necessary in systems employing water as the heat transfer medium to provide a means to stop the fluid circulation and to drain the collectors and pipes exposed to freezing temperatures for the duration of time the possibility of the fluid freezing exists.

In the drain mode, valve 10, discontinues circulation through supply inlet pipe 12 and return outlet pipe 15, and provides communication between supply outlet pipe 13, return inlet pipe 14, and a drain pipe 18 enamating from valve 10. The drain pipe 18 provides for positive drainage of all heat transfer fluid from supply outlet pipe 13, return inlet pipe 14, and the interconnected solar collector. When the outside temperature reaches a point where there is no longer any danger of fluid freezing, the valve 10 is returned to the circulation mode which seals off drain pipe 18 and interconnects the various pipes as above discussed.

Figure 2:
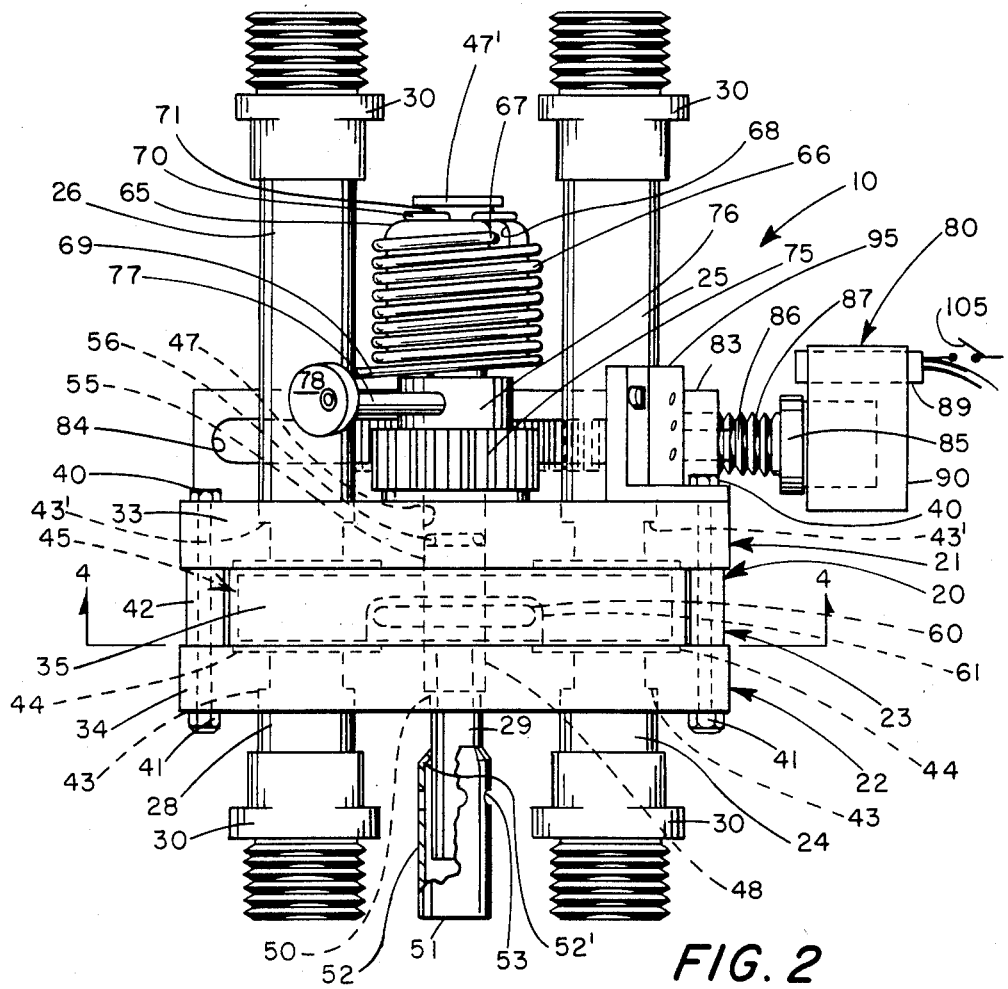
FIG. 2 is a side elevation view of the valve assembly shown schematically in FIG. 1 of the drawings.

Referring now particularly to FIG. 2, the valve 10 has a valve housing assembly, generally indicated by the numeral 20. As shown, the valve housing assembly 20 includes an upper housing, generally indicated by the numeral 21, a lower housing, generally indicated by the numeral 22, and an intermediate housing, generally indicated by the numeral 23. The upper and lower housings 21, 22 receive a supply inlet conduit 24, a supply outlet conduit 25, a return inlet conduit 26, a return outlet conduit 28 and drain conduit 29, each of which respectively connects to the above described supply inlet pipe 12, supply outlet pipe 13, return inlet pipe 14, return outlet pipe 15, and drain pipe 18. The supply inlet conduit 24, supply outlet conduit 25, return inlet conduit 26 and return outlet conduit 28 may be constructed of standard copper tubing and have threaded end fittings 30 which are sealingly matable with standard pipe connectors. The upper and lower housings 21, 22 include upper and lower housing plates 33 and 34 which may conveniently be square sheets of brass of approximately identical dimensions. At the corners of both the upper housing plate 33 and the lower housing plate 34 are bores 36 positioned to align with corresponding bores 36 in the other housing plate.

The intermediate housing 23 which spaces and joins in assembled condition the upper housing plate 33 and lower housing plate 34 is a continuous annular ring 35 that can be constructed of a segment of extruded brass. The ring 35 is shown concentrically located between the upper and lower housing plates 33, 34 and sealingly projects into respective annular grooves 38 in the inner faces of the upper housing plate 33 and the lower housing plate 34 (see FIG. 4). To insure a positive seal between the ring 35 and the upper and lower housing plates 33 and 34, the annular grooves 38 may contain resilient O-rings 39 which are compressed and form a sealed valve housing 20 when the upper housing plate 33, annular ring 35, and the lower housing plate 34 are assembled as hereinafter detailed.

The valve housing 20 is assembled by inserting fasteners 40 through the aligned bores 36 of the upper and lower housing plates 33, 34 drawing the plates 33 and 34 toward the enclosure ring 35 in order to seal the plates 33 and 34 against the ring 35 and thereby produce an enclosed valve housing 20. The fasteners 40 may be standard bolts secured by nuts 41. Spacers 42 may be provided to insure positive parallel alignment between the upper and lower housing plates 33 and 34. As shown, the spacers 42 are pieces of brass tubing of equal length which fit over the bolts 41 and are positioned between the upper and lower housing plates 33, and 34. The length of the spacers 43 is sized relative to the grooves 38 in the upper and lower housing plates 33, 34, the ring 35, and the characteristics of the resilient O-rings 39, in a manner to insure that the O-rings 39 are sealingly compressed by the ring 35 against the respective upper and lower housing plates 33 and 34.

The lower housing plate 34 contains circulation bores 43 positioned within the annular ring 35, that accept the corresponding inlet supply conduit 24 and return outlet conduit 28 of the valve 10. The bores extend through the entire thickness of the lower housing plate 34, and may have diameters to effect a seating insertion of conduit 24, 28 for brazing or welding in place to effect a fluid seal in a manner well known to persons skilled in the art. Positioned concentrically around the bores 43 on the inner face of lower housing plate 34 are annular grooves 44. The annular grooves 44 are provided to seat resilient O-rings (not shown) that project out of the grooves in order to effect a sealing function as hereinafter explained.

Positioned interiorly of the intermediate housing 23 is a valve element, generally indicated by the numeral 45 (see FIGS. 2 and 4), which includes a rotor 46 mounted on a shaft 47 and is otherwise configured and operates in a manner hereinafter detailed. The O-rings in grooves 44 contact the rotor 46 in sealing engagement. Located on the inner face of the lower housing plate 34, preferably centrally of the annular ring 35, is a cylindrical guide bore 48 which supports and aligns the lower end of shaft 47.

The lower housing plate 34 is also provided with two independent drain bores 50 positioned within the ring 35 and angularly displaced from the bores 43 about guide bore 48 as for example on a line perpendicular to a line connecting the centers of bores 43. The drain bores 50 seat the drain conduits 29 which may be welded or brazed in place. The drain pipe 18 may be provided with drain connectors 51 for attachment to drain conduits 29. The drain connectors 51 have a rigid sleeve 52 having an inner diameter greater than the outer diameter of conduit 29 so as to form an annular cavity between drain conduit 29 and sleeve 52. The upper end 52' of sleeve 52 is tapered to the outer diameter of the conduit 29 and is affixed to the tube in a manner that attaches and seals the sleeve 52 to conduit 29. The sleeve 52 has in the portions overlapping conduit 29 one or more orifices 53 which communicate with the annular cavity to permit ingress and egress of air to provide a continuous vaccum break in each of the drain connectors 51 and therefore effectively the connections through valve 10 and pipes 13, 14 between collector C and drain pipe 18 to thus insure drainage of the collector C as hereinabove described.

The upper housing plate 33 contains two bores 43' identical in design to the lower housing plate bores 43 that accept the supply outlet conduit 25 and the return inlet conduit 26 and are attached and sealed relative to the rotor 46 as described above in conjunction with lower housing plate 34. The supply outlet conduit 25 and the return inlet conduit 26 are positioned to vertically align with the supply inlet conduit 24 and the return outlet conduit 28, respectively, when the valve housing 20 is assembled.

The valve element 45 and particularly shaft 47 is further supported within valve housing 20 by a through bore 55 in upper housing 21 which is centered relative to the annular ring 35 and aligns with the guide bore 48. The through bore 55 supports the shaft 47 and to effect a fluid-tight seal therebetween the upper housing 21 may have an O-ring 56 interposed therein.

Figure 4:
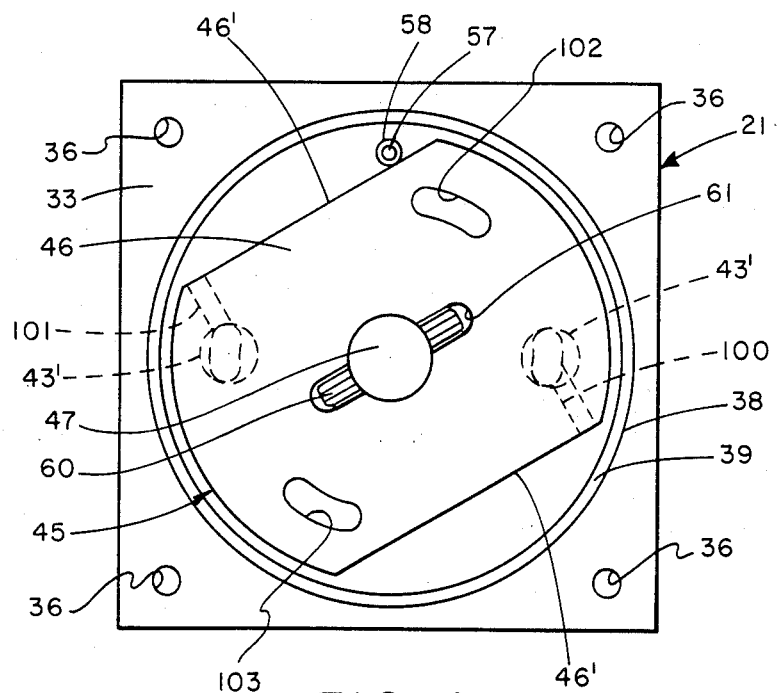
FIG. 4 is a sectional view taken substantially along the line 4—4 of FIG. 2 and showing particularly details of the rotor portion of the valve.

Rotation of shaft 47 and rotor 46 is controlled in part by a stop pin 57, best seen in FIG. 4. Stop pin 57 is positioned in a bore 58 in the inner surface of the upper housing 21 and extends a distance therefrom for engaging one of a pair of chord surfaces 46' on the rotor 46 which define the deviation of the rotor 46 from a cylindrical configuration. The rotor 46 of the valve element 45 is nonrotatably attached to the shaft 47 interiorly of the intermediate housing 23 by a pin 60 which extends through the shaft 47. The pin 60 is, as can be seen in FIGS. 2 and 4, seated in a slot 61 in the rotor 46 which extends axially from the shaft 47. It can thus be seen that rotation of the shaft 47 results in equivalent angular rotation of the rotor 46, subject to engagement with the stop 57 as hereinafter described.

A further factor in controlling rotation of the shaft 47 results from the fact that a portion 47' of the shaft 47 extends through the upper housing 21 of the valve housing assembly 20. The portion 47' of shaft 47 extending above the upper housing plate 33 carries a core 65 which is generally cylindrical and serves to position a torsion spring 66 in relation to the shaft 47. The torsion spring 66 has one extremity 67 thereof extending radially inwardly through a slot 68 in the core 65 and into a bore in the portion 47' of the shaft 47. Thus, the extremity 67 of torsion spring 66 is nonrotatably attached to shaft 47 and core 65. The other extremity 69 of the torsion spring 66 may be tangentially oriented relative to the core 65 and the torsion spring 66 and is anchored to prevent rotational movement as by engaging return outlet conduit 26 or other convenient appertenance on the exterior of the upper housing plate 33. The torsion spring 66 is arranged to continually bias the shaft 47 and the rotor 46 carried thereby toward the position depicted in FIG. 4. The core 64 and torsion spring 66 are positionally maintained axially of the shaft 47 proximate the extremity of portion 47' as by a conventional spring retainer 70 positioned in annular indentation 71 in the portion 47' of shaft 47.

Interposed between the upper housing plate 33 and the core 65 is a pinion gear 75 which has an integral extending sleeve 76. The pinion 75 and attached sleeve 76 are nonrotatably attached to shaft 47 by an actuating arm 77 extending through the sleeve 76 and portion 47' of the shaft 47. The actuating arm 77 which may carry an actuating element 78 at the distal end thereof therefore rotates with rotation of the shaft 47. The actuating arm 77 is thus normally positioned as seen in solid lines in FIG. 3 by virtue of its attachment to the shaft 47 which is normally biased by torsion spring 66 to the solid line position depicted therein.

The pinion 75 is selectively intermittently powered to rotate the shaft 47 by a drive assembly, generally indicated by the numeral 80. The drive assembly 80 has an extending rack 81 having teeth 82 adapted to matingly engage the teeth of the pinion 75. The tangential position of the rack 81 during the extent of its motion is controlled by a guide block 83 which has a guide slot 84 therein for the rack 81. The guide block may be rigidly attached to the upper housing plate 33 as by fasteners 40.

The drive assembly 80 includes elements for selectively driving the rack 81 and thereby powering the pinion 75 in opposition to the torsion spring 66. As shown, a wax powered heat sensitive driver 85 is positioned longitudinally of the rack 81. As is known to persons skilled in the art wax powered drivers contain a piston (not shown) which is movable in response to the expansion and contraction of the wax in a cylinder as a function of heat applied thereto. The wax powered driver 85 has a projecting sleeve 86 having threads 87 engaging mating threads in the guide block 83 to thereby adjustably position the sleeve 86 relative to the extremity of the rack 81. The positioning sleeve 86 has an internal plunger 88 (see FIG. 3) which extends axially outwardly of the sleeve 86 a variable distance controlled by heating of the wax within the driver 85 and resultant displacement of the piston element therein. Expansion of the wax or other medium within the driver 85 is controlled by the selective application of heat, as by an electrical resistance heater 89 (see FIG. 2). The driver 85 and heater 87 may conveniently be packaged in a heat transfer block 90 in order to provide an appropriate heat flow pattern from the heater 89 to the wax in the driver 85. The entire heat transfer block may be surrounded with an insulator (not shown) in order to partially control the effects of ambient temperature conditions.

Control of actuating current to the heater 89 is effected by an electrical switch which may be conveniently affixed to the upper housing 21 as by fastener 40. The switch 95 controls the application of electrical power to the resistance heater 89 by being connected in a conventional electrical power supply circuit. The switch 95 is normally in the on condition with current supplied thereto being applied to the heater 89. Depression of a contact 96 on switch turns the switch 95 off, discontinuing the flow of current through switch 95 to the heater 89. Release of the contact 96 returns the switch 95 to the on condition. The contact 96 is positioned on upper housing plate 34 within the arc of the distal end of actuating arm 77, the arm 77 and contact 96 being relatively positioned to result in contact between the actuating element 78 and contact 96 when the rotor 46 and shaft 47 are rotated through an angle to a predetermined position.

Valve element 45 is biased towards the position that drains the solar collectors by torsion spring 66. The torsion spring 66 biases the rotor 46 against stop pin 57, accurately aligning the rotor 46 relative to the housing 20. FIGS. 2 and 4 show the rotor 46 in the drain position, with a supply outlet drain duct 100 and return inlet drain duct 101 being respectively aligned with the bores 43' receiving supply outlet conduit 25 and return inlet conduit 26. As shown, the ducts 100, 101 are generally L-shaped cavities extending from the upper face of rotor 46 to the proximate chord surfaces 46' on rotor 46. In this position, supply inlet conduit 24 and return outlet conduit 28 are sealed from communication with the interior of valve 10 by the sealing action of resilient O-rings in grooves 44 engaging the bottom face of rotor 46. In this position electrical power is not being supplied to the resistance heater 89 and consequently no force is being exerted on the rack 81 by the driver 85. Also, in the drain position actuating arm 77 is located at its maximum distance from switch 95 as depicted by the solid line position in FIG. 3 and FIG. 2.

In the drain position, fluid in the solar collector C drains through the valve 10 from both supply outlet conduit 25 and return inlet 26, flowing through the supply outlet drain duct 100 and return inlet drain duct 101 in rotor 46, to the intermediate housing 23. From the housing 23 and particularly the cavities formed radially outwardly of the chord surface 46', the fluid flows into and through drain conduits 29, then aligned therewith.

Figure 3:
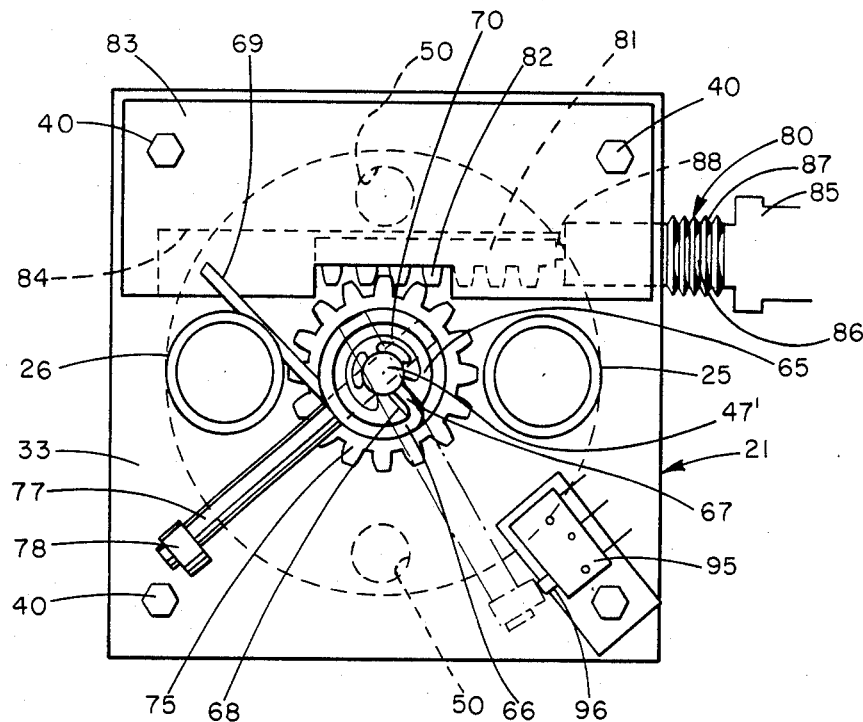
FIG. 3 is a fragmentary top plan view of the valve, as seen in FIG. 2, showing particularly the valve actuator and the actuator arm in solid and chain line positions depicting the limits of travel thereof.

The application of electrical power to the resistance heater 89 longitudinally moves the driver 85 translating the rack 81 against the pinion gear 64 to rotate it and concurrently the axle 47 and rotor 46. Continued rotation of the rotor 46 eventually aligns a rotor through slots 102 with the supply inlet conduit 24 and the supply outlet conduit 25, and a rotor through slot 103 with the return inlet conduit 26 and return outlet conduit 28, thus allowing fluid to circulate to and from the collector C through valve 10 as hereinabove described. As seen in FIG. 3, actuating arm 77 is rotated from the drain position (shown in solid lines) to the circulation position (shown in chain lines). When the arm 77 reaches the circulation position the actuating element 78 of arm 77 depresses the contact 96 of switch 95, turning off the power to resistance heater 89. In the absence of heating, the wax in driver 85 begins to cool and contract. When the driver 85 retracts the plunger 88 the torsion spring 66 operating through pinion gear 75 maintains the rack 81 in contact with plunger 88 with shaft 47 and actuating arm 77 beginning to rotate back towards the drain position. Rotation of actuating arm 77 toward the drain position disengages the contact 96 of switch 90 which restores power to the resistance heater 89 resulting, eventually upon heating of the wax, in rotation of actuating arm 77 back towards switch 96. During normal operation the switch 88 continues to cycle the resistance heater 89 from an on to an off condition maintaining the valve element 45 in the circulation position. The heater 89, torsion spring 66, and related components may be designed to minimize the number of cycles and to use components known to have a long service life while meeting the operating parameters specified hereinabove.

In order to accomplish draining of the collector C when the ambient temperature proximate thereto could possibly cause freezing of the heat transfer fluid, a differential thermostat may be installed proximate the collector C. Such a thermostat or other type sensor may have a switch 105 for discontinuing the supply of electrical power to the resistance heater 89. While the switch 105 may conveniently be wired in series with switch 95 to open the circuit to heater 89 when either switch is in an off or open condition, other more complex control circuits incorporating, e.g., delays, may be employed as will be appreciated by persons skilled in the art. It should also be appreciated that a loss of power to the power supply circuit or failure therein will result in the protective discontinuance of electrical power to heater 89 until the fault is corrected.

The valve 10 may also be provided with one or more mechanical backups to insure drainage of the collector C, particularly in the event of failure of components subjected to greater stress. If, for instance, the repeated cycling of switch 95 should fail to turn off the power to the resistance heater 89, the valve 10 is designed to fail in a manner that returns the valve to the drain position. If heat is continuously applied to driver 85, eventually the operating pressure will be exceeded and its cylinder will fail, thereby releasing all pressure. Alternatively, excess heat applied to driver 85 is transmitted via sleeve 86 to the threads in guide block 83, that can be constructed of a plastic material, which will melt at a preselected temperature resulting in the failure of the driver 85 to stroke the rack 81. Both types of failure remove the force acting against the bias of torsion spring 66 which allows the torsion spring 66 to return the rotor 46 to the drain position.

Thus it should be evident that the valve for a water temperature control system disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

What is claimed is:

1. A water temprature control system comprising a heat exchanger, a tank, and a pump for circulating heat transfer fluid through a supply line from the tank to the heat exchanger and through a return line from the heat exchanger to the tank, valve housing means interposed in both the supply line and the return line having supply inlet and supply outlet connections, having return inlet and return outlet connections, and having first and second drain connections, valve element means associated with said valve housing means having a first position for normally circulating the heat transfer fluid from said supply inlet connection to said supply outlet connection and from said return inlet connection to said return outlet connection and having a second position discontinuing circulation through said supply inlet connection and said return outlet connection and connecting said supply outlet connection to said first drain connection and said return inlet connection to said second drain connection, and orifice means in each of said drain connections directly communicating with the atmosphere for insuring drainage of the heat exchanger in said second position of said valve element means, and means for moving said valve element means to said second position upon the occurrence of any of a reduction in the ambient temperature proximate the heat exchanger below a predetermined value, a loss of power to the valve and a malfunction of the valve.

2. A system according to claim 1, wherein said means for moving said valve element means to said second position includes spring means continually biasing said valve element means.

3. A system according to claim 1, wherein said valve element means includes rotor means mounted within said valve housing means effecting selective communication between the requisite connections.

4. A system according to claim 3, wherein said rotor means is nonrotatably mounted on a shaft having a portion extending through said valve housing means, said portion of said shaft extending through said housing means carrying spring means for moving said valve element means to said second position.

5. A system according to claim 4 having a stop in said valve housing means which said rotor means engages at said second position due to torsional biasing provided by said spring means.

6. A system according to claim 5 having switch means mounted on said valve housing means for signaling the presence of said rotor means at said first position.

7. A system according to claim 1, including drive assembly means for selectively driving said valve element means from said second position to said first position.

8. A system according to claim 7 wherein said drive assembly means is actuated by heat responsive means which when heated selectively drives said valve element means and which is controlled by an electrical circuit, said electrical circuit having switch means selectively opening said electrical circuit.

9. A system according to claim 8 wherein said switch means is controlled by a temperature sensor proximate the heat exchanger.

10. A system according to claim 8 wherein said switch means has a contact for opening said electrical circuit positioned for engagement when said valve element means is in said first position.

11. A system according to claim 1 including drive assembly means having a driver for selectively moving a rack to rotate a pinion being nonrotatably mounted on a shaft supported by said valve housing means and carrying a rotor of said valve element means.

12. A system according to claim 11 wherein said driver has a plunger for engaging said rack mounted in a sleeve having threads for engaging the threads of a guide block mounted on said valve housing means.

13. A system according to claim 12 wherein said driver is constructed to fail at a preselected temperature resulting in a failure of said driver to actuate said rack.

14. A system according to claim 1 wherein said first and second drain connections independently communicate with drain line means.

15. A system according to claim 1 wherein said orifice means communicating with the atmosphere are proximate said valve housing means.

16. A system according to claim 1 wherein each said orifice means communicating with the atmosphere includes a drain conduit, a sleeve attached to a drain line and overlapping said drain conduit, and orifices in said sleeve.

* * * * *